(12) United States Patent
Chen et al.

(10) Patent No.: US 10,977,828 B2
(45) Date of Patent: Apr. 13, 2021

(54) IMAGE CALIBRATION METHOD AND IMAGE CALIBRATION APPARATUS

(71) Applicant: WISTRON NEWEB CORPORATION, Hsinchu (TW)

(72) Inventors: Yi-An Chen, Hsinchu (TW); Po-Ching Wu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 323 days.

(21) Appl. No.: 16/226,761

(22) Filed: Dec. 20, 2018

(65) Prior Publication Data
US 2019/0287267 A1  Sep. 19, 2019

(30) Foreign Application Priority Data

Mar. 14, 2018  (TW) .................................. 107108632

(51) Int. Cl.
*G06T 7/80* (2017.01)
*G06T 7/11* (2017.01)
*G06K 9/46* (2006.01)

(52) U.S. Cl.
CPC .................. *G06T 7/80* (2017.01); *G06K 9/46* (2013.01); *G06T 7/11* (2017.01)

(58) Field of Classification Search
CPC ............. G06T 7/80; G06T 2207/30252; G06T 2207/30204; G06T 2207/30264; G06T 5/006; G06T 7/11; H04N 17/002; H04N 7/18; H04N 7/181; B60R 1/00; B60R 2300/402; G01B 11/00; G01B 11/02; G01B 11/04; G01B 21/042; G01F 17/00; G01F 25/0084; G06K 19/06037; G06K 9/3216; G06K 9/46; G07B 17/00661; G07B 2017/00685

See application file for complete search history.

(56) References Cited

U.S. PATENT DOCUMENTS

| 2008/0186384 | A1 | 8/2008 | Ishii et al. |
| 2010/0134634 | A1 * | 6/2010 | Witt .......................... G06T 7/74 348/181 |

FOREIGN PATENT DOCUMENTS

| CN | 101236655 B | 5/2012 | |
| WO | 00/77726 A1 | 12/2000 | |
| WO | WO-0077726 A1 * | 12/2000 | ....... G06K 19/06037 |

* cited by examiner

*Primary Examiner* — Edward Park
*Assistant Examiner* — Michael J Vanchy, Jr.
(74) *Attorney, Agent, or Firm* — McClure, Qualey & Rodack, LLP

(57) ABSTRACT

Disclosed are an image calibration method and an image calibration apparatus. The image calibration method is adapted to the image calibration apparatus. The image calibration method includes: step (A): capturing an input image having a calibration pattern, wherein the calibration pattern includes at least one frame and an analysis block, the analysis block is surrounded by the frame, and the analysis block includes a plurality of characteristic patterns separated from each other; step (B): determining whether at least one frame is within the input image; step (C): capturing the analysis block when the at least one frame is within the input image; and step (D): executing one of a displacement calibration, a scaling ratio, a rotation calibration, a keystone calibration or a combination thereof for the input image according to positions of the characteristic patterns within the analysis block to generate an output image.

14 Claims, 11 Drawing Sheets

IMAGE CALIBRATION METHOD AND IMAGE CALIBRATION APPARATUS

BACKGROUND OF THE INVENTION

1. Field of the Invention

The present disclosure relates to an image calibration method and an image calibration apparatus; in particular, to an image calibration method and an image calibration apparatus that can execute one of a displacement calibration, a scaling ratio, a rotation calibration, a keystone calibration or a combination thereof for calibrating an input image.

2. Description of Related Art

In general, an image apparatus generates image distortion during assembly of a device (e.g., a driving mirror), and currently, the image distortion of an input image is analyzed via complex mathematic modules to be further calibrated. That is, the mathematic modules decrease the image distortion by simulating physical behavior of the image apparatus. However, due to some optical factors, the physical behavior of the image apparatus cannot be perfectly simulated by these mathematic modules. In addition, the input image may have a complex background image so that the image apparatus cannot effectively perform calibration, or even mistakably perform the calibration.

Therefore, how to calibrate the distortion of an image apparatus and to assure that the distortion of the image apparatus can be well calibrated is becoming an important issue in this field.

SUMMARY OF THE INVENTION

The purpose of the present disclosure is to provide an image calibration method and an image calibration apparatus that executes one of a displacement calibration, a scaling ratio, a rotation calibration, a keystone calibration or a combination thereof to calibrate an input image via a calibration pattern. In this manner, the image calibration method and the image calibration apparatus can provide a better calibrated image.

The embodiments of the present disclosure provide an image calibration method adapted to an image calibration apparatus. The image calibration method includes: step (A): capturing an input image having a calibration pattern, wherein the calibration pattern includes at least one a frame and an analysis block, the analysis block is surrounded by at least one frame, and the analysis block includes a plurality of characteristic patterns separated from each other; step (B): determining whether the at least one frame is within the input image; step (C): capturing the analysis block when the at least one frame is within the input image; and step (D): executing one of a displacement calibration, a scaling ratio, a rotation calibration, a keystone calibration or a combination thereof for the input image according to positions of the characteristic patterns within the analysis block to generate an output image.

The image calibration apparatus of the embodiments of the present disclosure includes an image capturing device and an image processor. The image processor is coupled to the image capturing device. The image capturing device captures an input voltage having a calibration pattern. The calibration pattern includes at least one a frame and an analysis block, the analysis block is surrounded by the at least one frame, and the analysis block includes a plurality of characteristic patterns separated from each other. The image processor is configured to: capture the input image having the calibration pattern; determine whether at least one frame is within the input image; capture the analysis block when the at least one frame is within the input image; and execute one of a displacement calibration, a scaling ratio, a rotation calibration, a keystone calibration or a combination thereof for the input image according to positions of the characteristic patterns within the analysis block to generate an output image.

To sum up, the image calibration method and the image calibration apparatus provided by the present disclosure, is to analyze a calibration pattern in an input image to capture an analysis block having characteristic patterns in the calibration pattern; then, according to positions where the characteristic patterns are in the analysis block, to perform one of the displacement calibration, the scaling ratio, the rotation angle, the rotation calibration, the keystone calibration or the combination thereof on the input image, to generate an output image. In this manner, image distortions of the image calibration apparatus can be reduced so that the calibration of the image calibration apparatus will be improved.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

Figure 1:
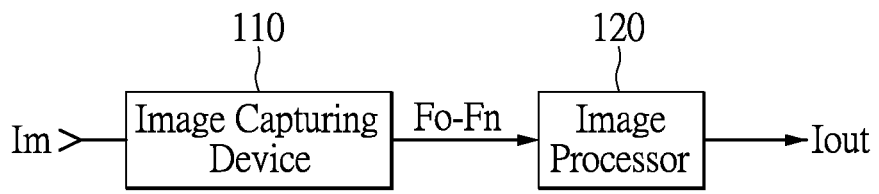
FIG. 1 shows a schematic diagram of an image calibration apparatus according to one embodiment of the present disclosure.

Referring to FIG. 1, a schematic diagram of an image calibration apparatus according to one embodiment of the present disclosure is shown. An image calibration apparatus 100 in FIG. 1 is for calibrating input pixels F0 to Fn in an input image Im, so as to calibrate an image distortion of the image calibration apparatus 100 and output an adjusted output image Tout. In this embodiment, the image calibration apparatus 100 may be a smart phone, an electronic rear-view mirror, a laptop, a monitoring system, a web camera or other image calibration apparatuses with a lens.

Figure 2:
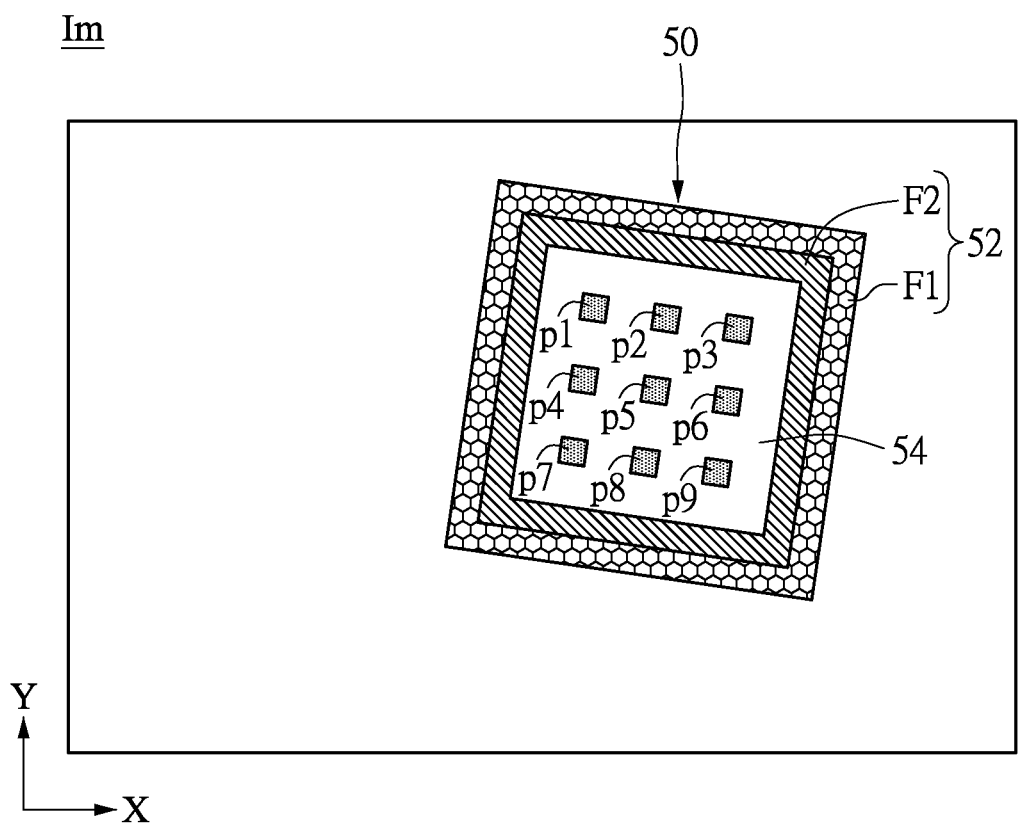
FIG. 2 shows a schematic diagram of an input image according to one embodiment of the present disclosure.

The image calibration apparatus 100 includes an image capturing device 110 and an image processor 120. As shown in FIG. 1 and FIG. 2, the image capturing device 110 captures the input image Im having a calibration pattern 50 and transmits all the input pixels F0 to Fn of the input image Im to the image processor 120 for following processing. In this embodiment, the image capturing device 110 may be a camera, a video recorder or other image capturing devices that can capture images.

As shown in FIG. 2, the calibration pattern 50 includes a filtering block 52 and an analysis block 54. The filtering block 52 has at least one frame located outside the analysis block 54. In this embodiment, the at least one frame includes a first frame F1 and a second frame F2. The first frame F1 and the second frame F2 are monochromatic. The first frame F1 has a first color (e.g., red), and the second frame has a second color (e.g., blue). Preferably, colors of frames can be selected from "red", "green" and "blue" or from "cyan", "magenta" and "yellow". The first frame F1 and the second frame F2 contacts each other, and the first color and the second color are different colors. The first frame F1 and the second frame F2 of the filtering block 52 are used to assist the image processor 120 to determine positions of the calibration pattern 50 in the input image Im.

Referring to FIG. 2, the analysis block 54 includes a plurality of characteristic patterns p1, p2, p3, p4, p5, p6, p7, p8 and p9 separated from each other and used to assist in calibrating the image distortion of the image calibration apparatus 100. In this embodiment, each of the characteristic patterns p1, p2, p3, p4, p5, p6, p7, p8 and p9 is a square and these squares form a larger square. Accordingly, the image processor 120 calibrates image distortions by using the characteristic patterns p1 to p9 within the analysis block 54.

Figure 3A:
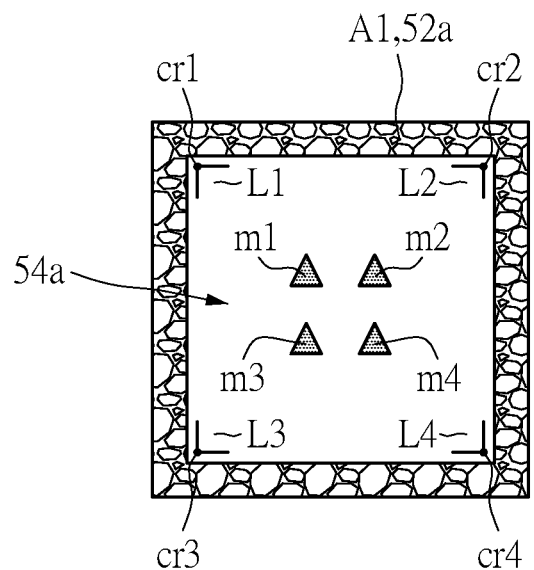
FIG. 3A shows a schematic diagram of a calibration pattern according to one embodiment of the present disclosure.

In other embodiments, as shown in FIG. 3A, the filtering block 52a of the calibration pattern 50a only includes a frame A1, and the frame A1 is monochromatic (e.g., green). The analysis block 54a includes four characteristic patterns m1, m2, m3 and m4 separated from each other. Each characteristic pattern is a triangle being evenly spread in the analysis block 54a. It should be noted that, the analysis block 54a further has a plurality of anchor patterns L1, L2, L3 and L4, and these anchor patterns L1 to L4 are respectively located at corners of the analysis block 54a. By using the anchor patterns L1 to L4, the image processor 120 is able to more precisely capture the position of the analysis block 54a of the input image Im, and a number of pixels that the image processor 120 needs to process in the following processing procedure will be reduced. The anchor patterns L1 to L4 are within a region between the frame A1 and the characteristic patterns m1 to m4 and are not overlapped with the characteristic patterns m1, m2, m3 and m4. Also, the anchor patterns L1, L2, L3 and L4 are evenly spread in the analysis block 54a. By detecting the anchor patterns L1 to L4, the image processor 120 can further determine the region of the analysis block 54a so as to capture the analysis block 54a more precisely.

Figure 3B:
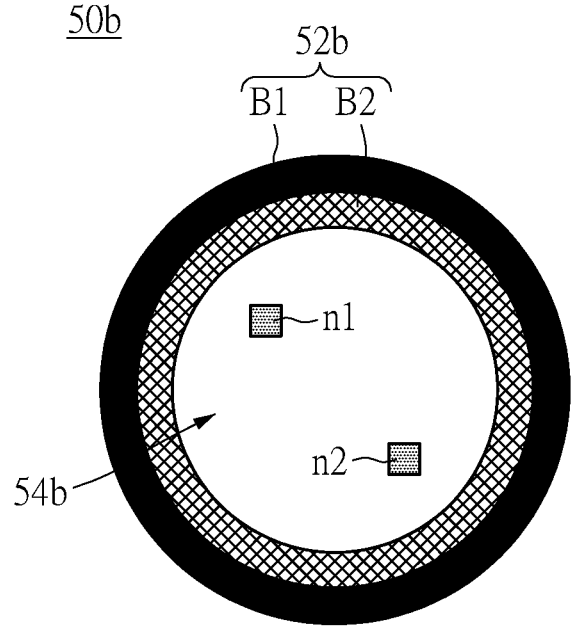
FIG. 3B shows a schematic diagram of a calibration pattern according to another embodiment of the present disclosure.

In other embodiments, as shown in FIG. 3B, the filtering block 52b of the calibration pattern 50b includes two frames B1 and B2. The frames B1 and B2 are respectively monochromatic (e.g., black and red), and are concentric circles. The analysis block 54b includes two characteristic patterns n1 and n2. Each of the characteristic patterns n1 and n2 is a square and evenly spread in the analysis block 54b. By using the characteristic patterns n1 and n2, the image processor 120 can perform calibration procedures.

From the above descriptions about the calibration patterns 50, 50a and 50b in different embodiments, the number, the color or the shape of the frames of the filtering block are not limited by the present disclosure. Moreover, in the present disclosure, the number of the characteristic patterns should be two or more, but the shape of the characteristic patterns are not restricted as long as they are within the analysis block.

It should be noted that, the image calibration apparatus 100 may generate the image distortion during assembling a device so that the calibration pattern 50 of the input image Im may have image distortions and shifts, as shown in FIG. 2. Therefore, the image processor 120 needs to calibrate the image distortions of the image calibration apparatus 100 by adjusting the input image Im.

Figure 4:
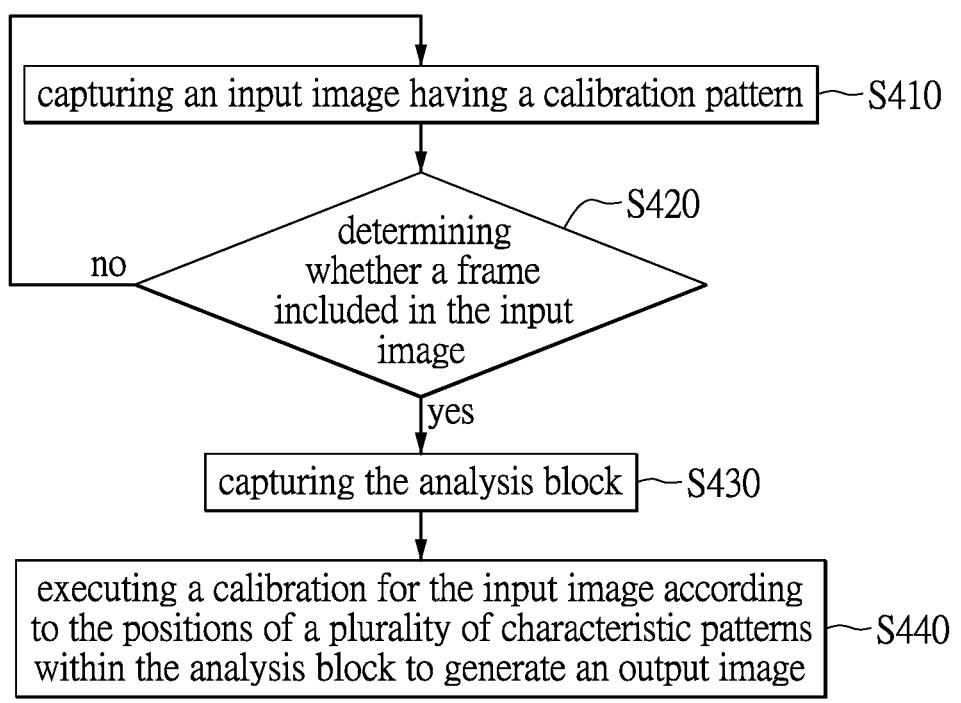
FIG. 4 shows a flow chart of an image calibration method according to one embodiment of the present disclosure.

FIG. 4 shows a flow chart of an image calibration method according to one embodiment of the present disclosure. According to FIG. 2 and FIG. 4, the image processor 120 is electrically connected to the image capturing device 110 and executes the following steps to adjust the input image Im and further calibrate the distortions of the image calibration apparatus 100. In step S410, the image processor 120 captures the input image Im having the calibration pattern 50. In step S420, the image processor 120 determines whether a frame included in the input image Im. If there is no frame included in the input image Im, the image processor 120 again executes step S410. If there is at least one frame included in the input image Im, the image processor 120 executes step S430.

There is a predetermined distance between the image calibration apparatus 100 and the calibration pattern 50. The calibration pattern 50 includes the first frame F1 and the second frame F2. The first frame F1 and the second frame F2 are monochromatic, the first frame has a first color, and the second frame has a second color. In step S420, the image processor 120 sequentially scans the calibration pattern 50 in a predetermined direction, and calculates whether a pixel number of the first color exceeds a first predetermined value. If the pixel number of the first color does not exceed the first predetermined value, it indicates that the image processor 120 does not determine the first frame F1. In this case, the image processor 120 again executes step S410. If the pixel number of the first color exceeds the first predetermined value, it indicates that the image processor 120 determines the first frame F1. In this case, the image processor 120 further calculates whether a pixel number of the second color exceeds a second predetermined value. If the pixel number of the second color does not exceed the second predetermined value, it indicates that the image processor 120 does not determine the second frame F2. In this case, the image processor 120 executes step S410 again. If the pixel number of the second color exceeds the second predetermined value, it indicates that the image processor 120 determines the second frame F2. At this time, the image processor 120 determines that there is a frame in the input image Im. It should be noted that, the predetermined direction may be a horizontal direction X, a vertical direction Y or other regular directions of the input image Im, which is not limited thereto.

In step S430, the image processor 120 captures the analysis block 54 according to positions where the first frame F1 and the second frame F2 are in the input image Im. Further, the image processor 120 captures a region within the first frame F1 and the second frame F2 as the analysis block 54. Also, the image processor 120 can capture the region within the first frame F1 and the second frame F2 as the analysis block 54 by dividing in the horizontal direction X and in the vertical direction Y, which is not limited thereto.

In other embodiments, if the analysis block 54 has, for example, the plurality of the anchor patterns L1 to L4 in FIG. 3A, the anchor patterns L1 to L4 are located at the corners of the analysis block 24. In step S430, the image processor 120 further detects a pixel position (not shown in FIG. 2) of each of the anchor patterns L1 to L4 in the input image Im, and then captures the analysis block 54 according to the pixel position of each of the anchor patterns L1 to L4. As shown in FIG. 3A, the anchor patterns L1 to L4 are L-shaped. In this case, the pixel positions may refer to positions of corners cr1, cr2, cr3 and cr4 of the anchor patterns L1 to L4. In this embodiment, the image processor 120 captures the region outside the anchor patterns L1 to L4 to serve as the analysis block 54. Also, the image processor 120 may capture the region within each of the anchor patterns L1 to L4 to serve as the analysis block 54, which is not limited thereto.

Finally, in step S440, the image processor 120 executes one of a displacement calibration, a scaling ratio, a rotation calibration, a keystone calibration or a combination thereof for the input image Im according to positions of a plurality of characteristic patterns p1 to p9 within the analysis block 54 to generate an output image. The following descriptions describe how the image processor 120 executes the displacement calibration, the scaling ratio, the rotation calibration and the keystone calibration for the input image Im.

Figure 5A:
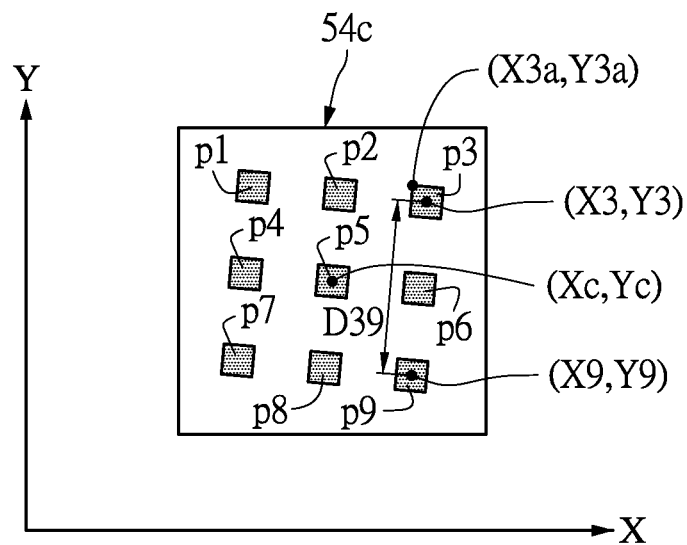
FIG. 5A shows a schematic diagram of an analysis block according to one embodiment of the present disclosure.
Figure 5B:
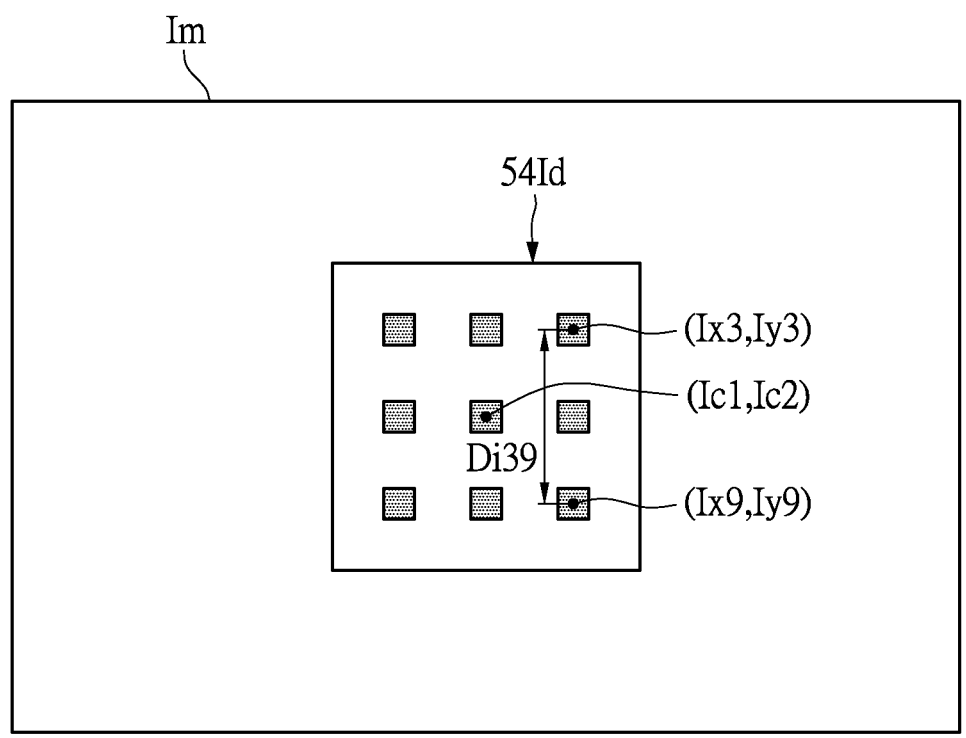
FIG. 5B shows a schematic diagram of an ideal block according to one embodiment of the present disclosure.

As shown in FIG. 5A, the image processor 120 captures a region same as the region within the first frame F1 and the second frame F2 of FIG. 2 as the analysis block 54c by dividing in the horizontal direction X and the vertical direction Y. As shown in FIG. 5B, the image processor 120 simulates an ideal block 54Id corresponding to the analysis block 54c having no distortion. The ideal block 54Id is at the center of the input image Im. The ideal block 54Id includes a plurality of ideal patterns, and positions of the ideal patterns within the ideal block 54Id respectively correspond to positions of the characteristic patterns p1 to p9 within the analysis block 54c having no distortion so that the image processor 120 can execute the displacement calibration for the input image Im.

Steps of executing the displacement calibration are described as below. First, the image processor 120 calculates an actual center coordinate (Xc, Yc) of the analysis block 54c according to the positions of the characteristic patterns p1 to p9 within the analysis block 54c. For example, the image processor 120 calculates the actual center coordinate (Xc, Yc) of the analysis block 54c according to the position of the characteristic pattern p5 or according to the positions of the characteristic patterns p1 and p9. After that, the image processor 120 calculates a displacement between an ideal center coordinate (Ic1, Ic2) of the ideal block 54Id and the actual center coordinate (Xc, Yc). Then, the image processor 120 calculates a displacement value between the actual center coordinate (Xc, Yc) and the ideal center coordinate (Id1, Ic2) of the ideal block 54Id. For instance, the displacement value is represented by a vector, namely, (Ic1-Xc,Ic2-Yc). Finally, the image processor 120 calibrates the input image Im according to the displacement value. People skilled in the art should understand how the image processor 120 calibrates the input image Im according to the displacement value, and thus relevant details are omitted therein.

In other embodiments, the image processor 120 can execute the displacement calibration for the input image Im according to one of the characteristic patterns p1 to p9. For ease of illustration, the characteristic pattern p3 is selected to be an exemplary example. First, the image processor 120 calculates the actual analysis coordinate (X3, Y3) of the characteristic pattern p3 in the analysis block 54c. After that, the image processor 120 calculates a displacement between an ideal center coordinate (Ix3, Iy3) of the ideal block 54Id and the actual center coordinate (X3, Y3). The characteristic pattern p3 corresponds to the ideal pattern (i.e., the ideal pattern at the upper right corner of the ideal block 54Id in FIG. 5B) corresponding to the ideal analysis coordinate (Ix3, Iy3). In this case, the displacement value can be represented as (Ix3-X3, Iy3-Y3). Finally, the image processor 120 calibrates the input image Im according to the displacement value. In this embodiment, the image processor 120 takes the center of the characteristic pattern p3 as the actual analysis coordinate (X3, Y3). However, in other embodiments, the image processor 120 can take a specific position, for example, the upper left corner, the upper right corner, the lower left corner or the lower right corner of the characteristic pattern p3 as the actual analysis coordinate (X3a, Y3a). In this case, the ideal analysis coordinate of the ideal pattern has to correspond to the specific position of the characteristic pattern p3.

According to FIG. 5A and FIG. 5B, the image processor 120 can also execute the scaling ratio for the input image Im. Before the execution of the scaling ratio, the image processor 120 selects a first characteristic pattern and a second characteristic pattern from the analysis block 54c, and selects a first ideal pattern corresponding to the first characteristic pattern and a second ideal pattern corresponding to the second characteristic pattern from the ideal block 541d. For example, if the characteristic patterns p3 and p9 are selected as the first characteristic pattern and the second characteristic pattern by the image processor 120, the ideal patterns at the upper right corner and at the lower right corner of the ideal block 541d will be selected as the first ideal pattern and the second ideal pattern by the image processor 120.

Then, the image processor 120 can execute the scaling ratio for the input image Im. Steps of performing the scaling ratio are described as below. First, the image processor 120 calculates an actual distance between the first characteristic pattern and the second characteristic pattern, and calculates an ideal distance between the first ideal pattern and the second ideal pattern. In this embodiment, the actual distance D39 (e.g., 203 pixels) between the characteristic patterns p3 and p9 is calculated according to the actual analysis coordinates (X3, Y3) and (X9, Y9) of the characteristic patterns p3 and p9, and the ideal distance Di39 (e.g., 210 pixels) is calculated according to ideal analysis coordinates (Ix3, Iy3) and (Ix9, Iy9).

After that, the image processor 120 calculates a scaling ratio between the actual distance and the ideal distance. In this embodiment, the scaling ratio equals to the actual distance divided by the ideal distance, but the present disclosure is not limited thereto. In this embodiment, the scaling ratio is obtained by dividing the actual distance D39 by the ideal distance Di39 (i.e., 203/210=0.97), which indicates that the analysis block 54c is 0.97 times the ideal block 54Id. The image processor 120 can also calculate the scaling ratio between the actual distance and the ideal distance by using other methods, which is not limited thereto. Finally, the image processor 120 calibrates the input image Im according to the scaling ratio. It is worth mentioning that, those skilled in the art should understand how the image processor 120 calibrates the input image Im according to the scaling ratio, and thus relevant details are omitted.

Figure 6A:
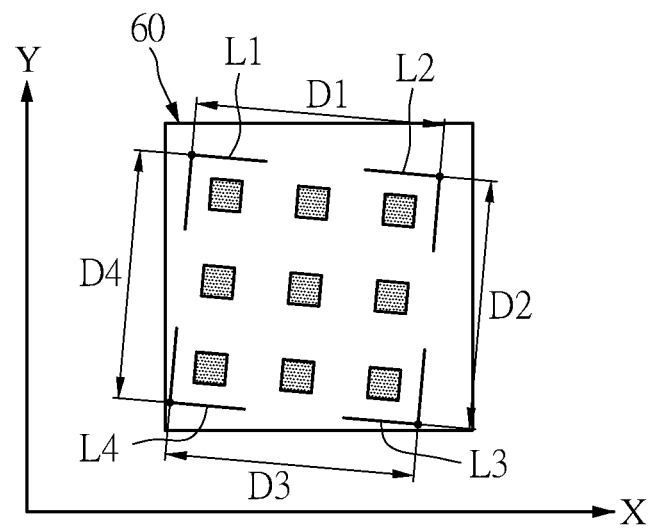
FIG. 6A shows a schematic diagram of an analysis block including anchor patterns according to one embodiment of the present disclosure.
Figure 6B:
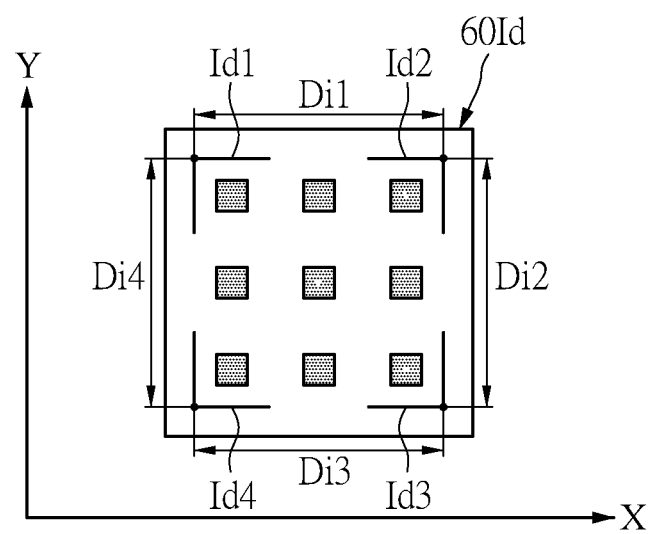
FIG. 6B shows a schematic diagram of an ideal block including anchor patterns according to one embodiment of the present disclosure.

In other embodiments, the image processor 120 can also execute the scaling ratio for the input image Im according to the anchor patterns in FIG. 6A and FIG. 6B. Compared with the analysis block 54c in FIG. 5A, an analysis block 60 captured in FIG. 6A further has the plurality of the anchor patterns L1 to L4. The image processor 120 captures a region outside each of the anchor patterns L1 to L4 to serve as the analysis block 60 by dividing in the horizontal direction X and in the vertical direction Y, and the analysis block 60 includes the anchor patterns L1 to L4. The anchor patterns L1 to L4 are at corners of the analysis block 60, for example, at the upper left corner, at the upper right corner, at the lower left corner and at the lower right corner of the analysis block 60.

Compared with the ideal block 54Id in FIG. 5B, an ideal block 60Id in FIG. 6B has a plurality of ideal anchor patterns Id1, Id2, Id3 and Id4. Positions of the ideal anchor patterns Id1, Id2, Id3 and Id4 within the ideal block 60Id correspond to positions of the anchor patterns L1-L4 within the analysis block 60 having not distortion.

Before the execution of the scaling ratio, the image processor 120 selects a first anchor pattern and a second anchor pattern from the analysis block 60, and selects a first ideal anchor pattern corresponding to the first anchor pattern and a second ideal anchor pattern corresponding to the second anchor pattern from the ideal block 60Id. For example, if the anchor patterns L1 and L2 are selected as the first anchor pattern and the second anchor pattern, ideal anchor patterns Id1 and Id2 at the upper left corner and the upper right corner of the ideal block 60Id will be selected as the first ideal pattern and the second ideal pattern.

Then, the image processor 120 executes the scaling ratio for the input image Im. Steps of the scaling ratio are described as below. First, the image processor 120 calculates an actual distance between the first anchor pattern and the second anchor pattern, and calculates an ideal distance between the first ideal anchor pattern and the second ideal pattern. In this embodiment, an actual distance D1 (e.g., 203 pixels) between the anchor patterns L1 and L2 is calculated, and an ideal distance Di1 (e.g., 210 pixels) is calculated. The actual distance D1 can be calculated according to the coordinates of the anchor patterns L1 and L2 (e.g., the position of the corner of the anchor pattern L1 and the position of the corner of the anchor pattern L2), and the ideal distance Di1 can be calculated according to coordinates of the ideal anchor patterns I1 and I2 (e.g., the position of the corner of the ideal anchor pattern Id1 and the position of the corner of the ideal anchor pattern Id2 is).

After that, the image processor 120 calculates a scaling ratio between the actual distance D1 and the ideal distance Di1. In this embodiment, the scaling ratio equals to the actual distance D1 divided by the ideal distance Di1, but the present disclosure is not limited thereto. In this case, the scaling ratio is D1/Di1, namely, 203/210=0.97, which indicates that the analysis block 60 is 0.97 times the ideal block 60Id. The image processor 120 can calculate the scaling ratio between actual distance D1 and the ideal distance Di1, which is not limited thereto. The image processor 120 calibrates the input image Im according to the scaling ratio. That is, the image processor 120 calibrates the input image Im according to the scaling ratio of 0.97. Those skilled in the art should understand how the image processor 120 calibrates the input image Im according to the scaling ratio, and thus relevant details are omitted.

In other embodiments, the image processor 120 can execute the scaling ratio for the input image Im according to the plurality of the scaling ratios corresponding to the plurality of the anchor patterns L1 to L4 and the plurality of the ideal anchor patterns Id1 to Id4. The image processor 120 calculates the actual distances D1, D2, D3 and D4 among the anchor patterns L1 to L4 and the ideal distances Di1, Di2, Di3 and Di4 among the ideal anchor patterns Id1 to Id4. Then, the image processor 120 calculates four different scaling ratios Sca1, Sca2, Sca3 and Sca4 between the actual distances D1 to D4 and the corresponding ideal distances Di1 to Di4, and the scaling ratios Sca1 to Sca4 is are 0.97, 0.98, 0.98 and 0.98, for example. Then, the image processor 120 averages the four scaling ratios Sca1, Sca2, Sca3 and Sca4, namely, (0.97+0.98+0.98+0.98)/4=0.98), to show that the analysis block 60 is 0.98 times the ideal block 60Id. Accordingly, based on the plurality of the scaling ratios Sca1 to Sca4, a possibility of a wrong calculation of the scaling ratio may be reduced based on the plurality of the scaling ratios Sca1 to Sca4.

In other embodiments, for example, the image processor 120 can average the scaling ratios Sca1 and Sca3 to calculate a scaling ratio SHOR (e.g., (0.97+0.98)/2=0.975) in the horizontal direction X. Similarly, the image processor 120 can average the scaling ratios Sca2 and Sca4 to calculate a scaling ratio SVER (e.g., (0.98+0.98)/2=0.98) in the vertical direction Y. Then, the image processor 120 calibrates a position where the input image Im is located in the horizontal direction X according to the scaling ratio SHOR and calibrates a position where the input image Im is located in the vertical direction Y according to the scaling ratio SVER. Those skilled in the art should understand how the image processor 120 calibrates the input image Im according to the scaling ratio, and thus relevant details are omitted.

Figure 7A:
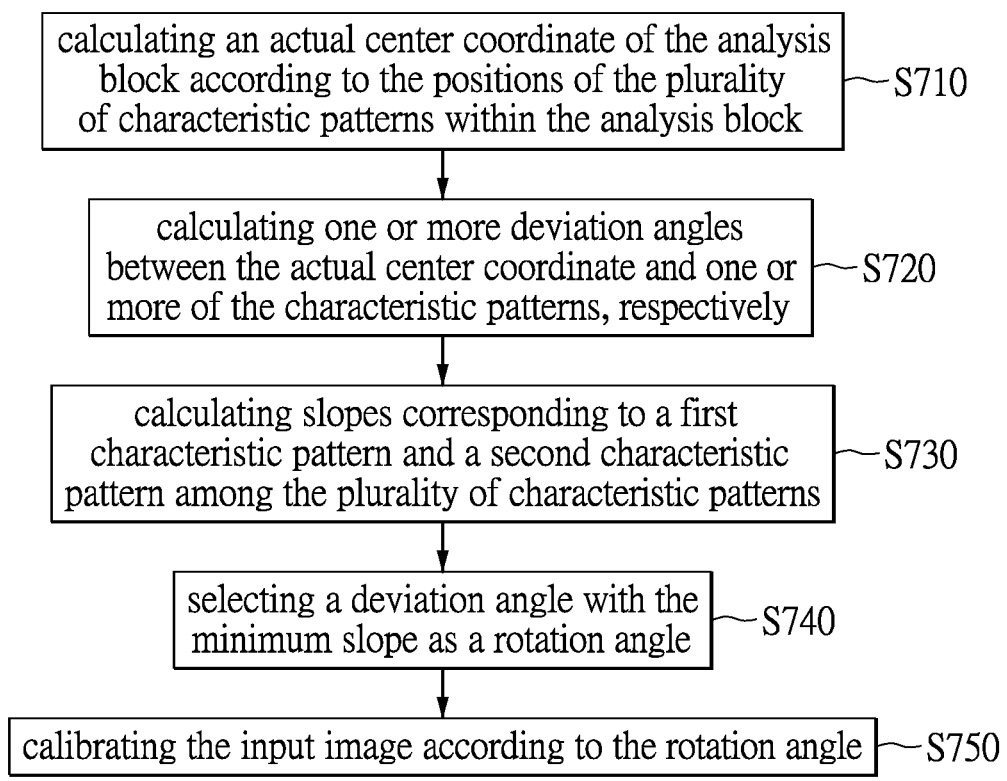
FIG. 7A shows a flow chart of a rotation calibration in an image calibration method according to one embodiment of the present disclosure.
Figure 7B:
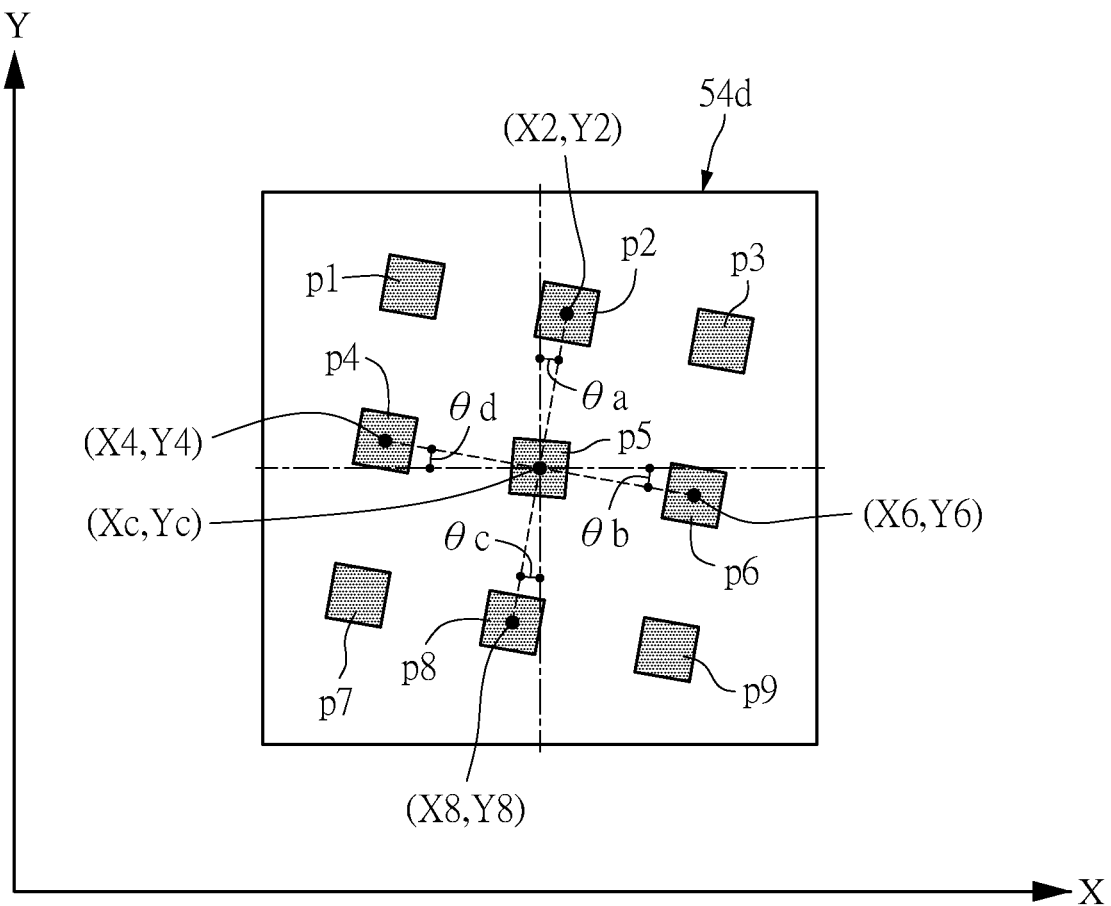
FIG. 7B shows a schematic diagram of a deviation angle between an actual center coordinate and the characteristic patterns according to one embodiment of the present disclosure.

FIG. 7A shows a flow chart of a rotation calibration in an image calibration method according to one embodiment of the present disclosure, and FIG. 7B shows a schematic diagram of a deviation angle between the actual center coordinate and each of the characteristic patterns according to one embodiment of the present disclosure. As shown in FIG. 7B, the image processor 120 captures a region same as the region within the first frame F1 and the second frame F2 of FIG. 2 as an analysis block 54d by dividing in the horizontal direction X and the vertical direction Y for the image processor 120 to execute the rotation calibration for the input image Im.

Steps of the rotation calibration are shown in FIG. 7A. In step S710, the image processor 120 calculates an actual center coordinate (Xc, Yc) according to the positions of the characteristic patterns p1 to p9 within the analysis block 54d. Then, in step S720, the image processor 120 calculates one or more deviation angles between the actual center coordinate (Xc, Yc) and one or more of the characteristic patterns p1 to p9, respectively. Taking the characteristic patterns p2, p4, p6 and p8 as an example, a deviation angle θa is formed by an extension line of a line between the actual center coordinate (Xc, Yc) and an actual analysis coordinate (X2,Y2) of the characteristic pattern p2 and the vertical direction Y, a deviation angle θb is formed between an extension line of a line between the actual center coordinate (Xc, Yc) and an actual analysis coordinate (X6,Y6) of the characteristic pattern p6 and the horizontal direction X, a deviation angle θc is formed between an extension line of a line between the actual center coordinate (Xc, Yc) and an actual analysis coordinate (X8,Y8) of the characteristic pattern p8 and the vertical direction Y, and a deviation angle θd is formed between an extension line of a line between the actual center coordinate (Xc, Yc) and an actual analysis coordinate (X4,Y4) of the characteristic pattern p4 and the horizontal direction X.

Figure 7C:
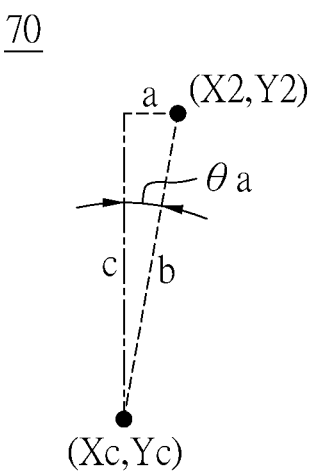
FIG. 7C shows a schematic diagram of one of the deviation angles in FIG. 7B.

The following descriptions are for illustrating how the deviation angles (e.g., θa to θd) are calculated. The deviation angles θa to θd are calculated according to the actual center coordinate and the actual analysis coordinates. As shown in FIG. 7C, a right triangle 70 is formed by a line between the actual analysis coordinate (X2,Y2) and the actual center coordinate (Xc,Yc), and the horizontal direction X The lengths of three sides of the right triangle 70 are a length a, a length b and a length c. Therefore, the deviation angle θa can be represented by the following Equation 1.

$$\theta a = \arccos \frac{b^2 + c^2 + a^2}{2bc} \quad \text{(Equation 1)}$$

Likewise, the deviation angles θb, θc and θd can be represented by equations similar to the Equation 1. In FIG. 7B, the deviation angles θa, θb, θc and θd can be, for example, −3.92, −3.87, −4.70 and −3.92.

After that, the image processor 120 selects two characteristic patterns (e.g. the characteristic patterns p1 and p3) from the characteristic patterns p1 to p9 as a first characteristic pattern and a second characteristic pattern. The image processor 120 adjusts coordinates of the first characteristic pattern and the second characteristic pattern according to each of the deviation angles and a rotation equation Frot(X, Y), and generates a rotated coordinate of the first characteristic pattern and a rotated coordinate of the second characteristic pattern. In this embodiment, the rotation equation Frot(X, Y) includes a rotation equation Fr(X) in the horizontal direction X and a rotation equation Fr(Y) in the vertical direction Y, and the Frot(X, Y) can be represented as an equation as below.

$$Frot(X, Y) = \begin{cases} Fr(Xn) = \cos\left(\frac{\theta_x \times \pi}{180°}\right) \times (Xn - 0) - \sin\left(\frac{\theta_x \times \pi}{180°}\right) \times (Yn - 0) + 0 \\ Fr(Yn) = \sin\left(\frac{\theta_x \times \pi}{180°}\right) \times (Xn - 0) + \cos\left(\frac{\theta_x \times \pi}{180°}\right) \times (Yn - 0) + 0 \end{cases}$$

In the above equation, (Xn,Yn) is a coordinate of the characteristic pattern in the horizontal direction X and in the vertical direction Y, and θx is a deviation angle. For example, the image processor 120 selects the characteristic pattern p1 as the first characteristic pattern and the coordinate (X1,Y1) is (545,249), for example. The image processor 120 selects the characteristic pattern p3 as the second characteristic pattern and the coordinate (X3, Y3) is (763, 262), for example. Therefore, the image processor 120 substitutes the coordinate (X1, Y1) of the characteristic pattern p1 and the deviation angle θa into the rotation equation Frot(X, Y), to obtain a rotated coordinate (X1a, Y1a) of the characteristic pattern p1 as (537, 255). In addition, the image processor 120 substitutes the coordinate (X3, Y3) of the characteristic pattern p3 and the deviation angle θa into the rotation equation Frot(X, Y), to obtain a rotated coordinate (X3a, Y3a) of the characteristic pattern p3 as (756, 253).

In step S730, the image processor 120 calculates a slope corresponding to the first characteristic pattern and the second characteristic pattern among the plurality of characteristic patterns according to the two rotated coordinates. In this embodiment, the slope corresponding to the first characteristic pattern and the second characteristic pattern refers to a slope between the two rotated coordinates. For example, a slope ma corresponding to the characteristic patterns p1 and p3 can be calculated as below.

$$ma = \frac{Y3a - Y1a}{X3a - X1a} = \frac{253 - 255}{756 - 537} = \frac{-2}{219} = -0.009132$$

Accordingly, with respect to the deviation angle θa, the slope ma corresponding to the characteristic patterns p1 and p3 is −0.009132. Likewise, with respect to the deviation angles θb, θc and θd, the slopes mb, mc and md corresponding to the characteristic patterns p1 and p3 are −0.009163, −0.22936 and −0.009132.

The closer the slope is to zero, the more accurate the deviation angle will be. Therefore, in step S740, the image processor 120 selects a deviation angle with the minimum slope as a rotation angle. Based on the above, among the slopes ma, mb, mc and md (i.e., −0.009132, −0.009163, −0.22936 and −0.009132), the slopes ma and md are smallest, so the processor 120 selects the deviation angles θa and θd (i.e., −3.92) as the rotation angle.

Finally, in step S750, the image processor 120 calibrates the input image Im according to the rotation angle. Those skilled in the art should understand how the image processor 120 calibrates the input image Im according to step S750, and thus relevant details are omitted.

Figure 8A:
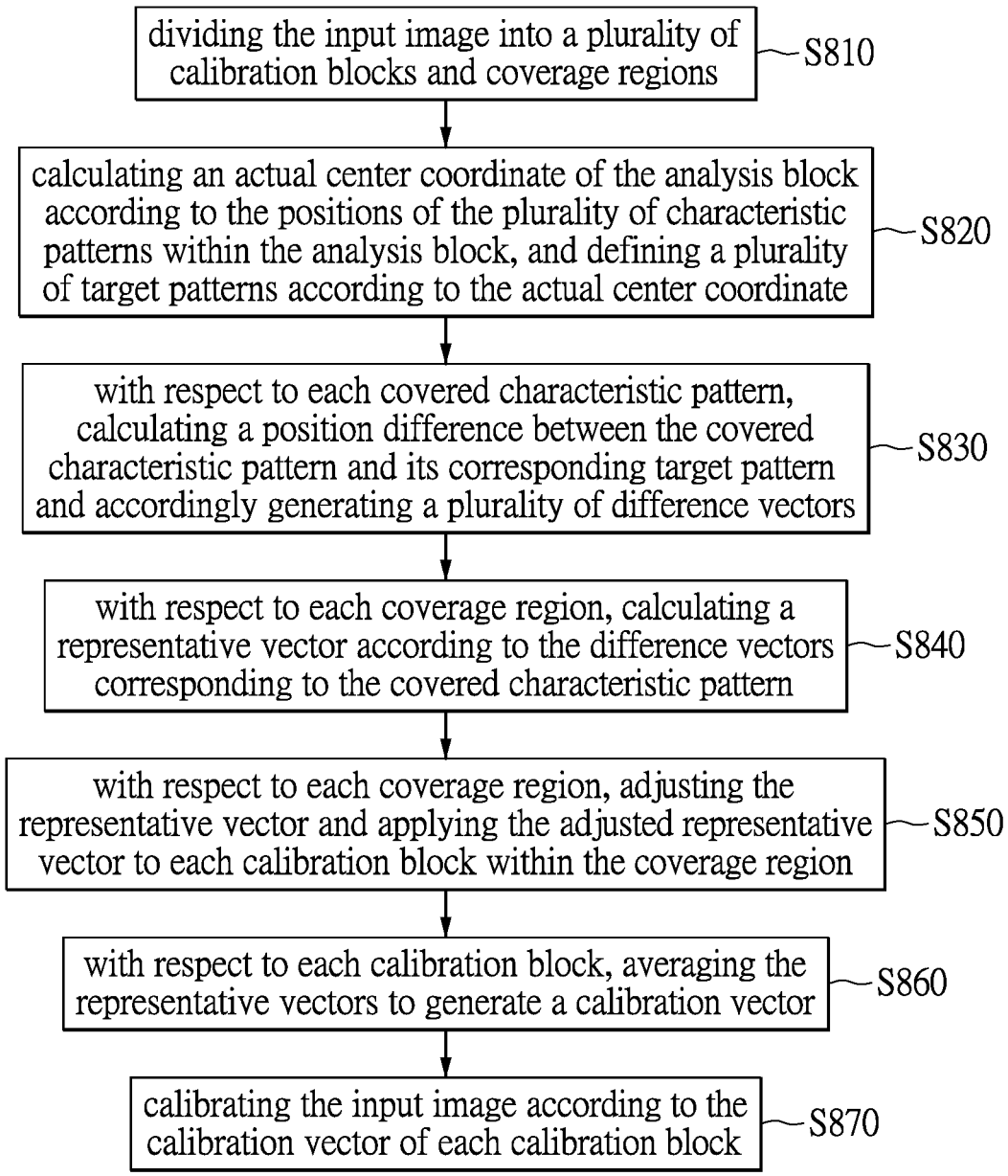
FIG. 8A shows a flow chart of a keystone calibration in an image calibration method according to one embodiment of the present disclosure.

Moreover, steps of performing a keystone calibration are shown in FIG. 8A. The image processor 120 executes the keystone calibration for the input image Im according to positions of the characteristic patterns p1 to p9 within the analysis block 54. In step S810, the image processor 120 divides the input image Im into a plurality of calibration blocks BLKs and a plurality of coverage regions COV1, COV2, COV3 and COV4. In this embodiment, the coverage regions COV1, COV2, COV3 and COV4 cover all the calibration blocks BLKs, and each of the coverage regions COV1 to COV4 covers part of the calibration blocks BLKs and a covered characteristic pattern. In other embodiments, each of the coverage regions COV1 to COV4 may have more than one covered characteristic pattern, which is not limited thereto. Each of the coverage regions COV1 to COV4 may cover the calibration blocks BLKs overlapping or calibration blocks BLKs not overlapping.

Figure 8B:
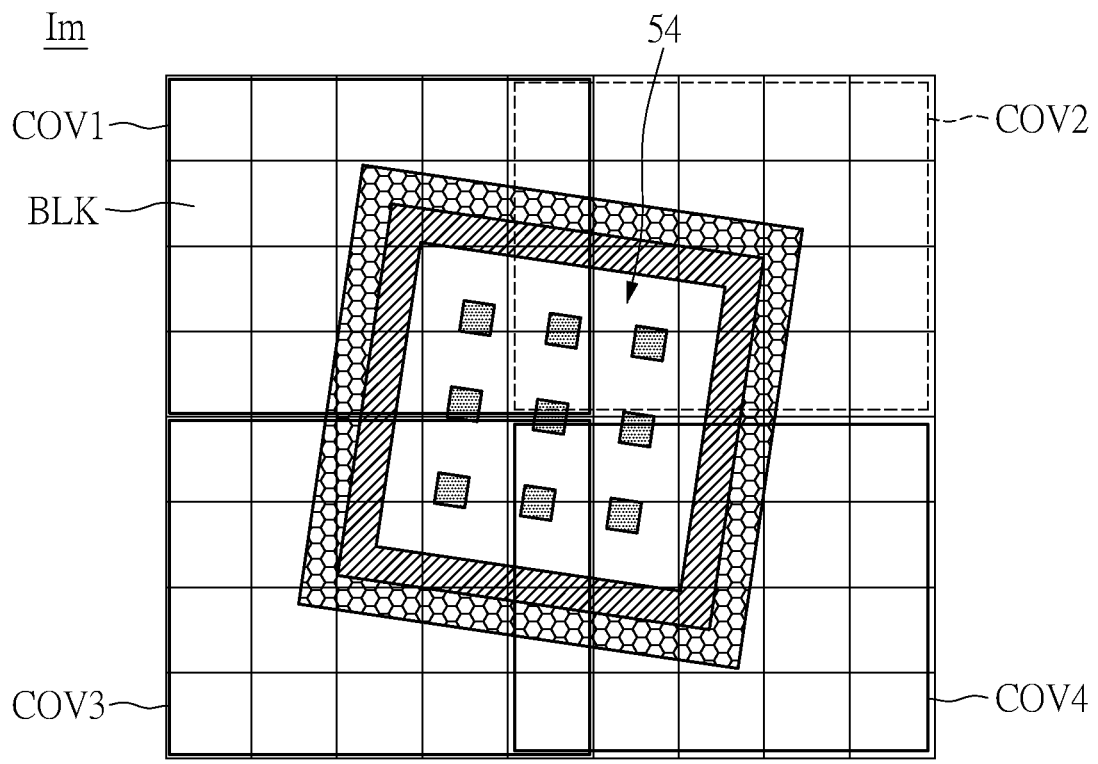
FIG. 8B shows a schematic diagram of an input image having a plurality of calibration blocks and a plurality of coverage regions according to one embodiment of the present disclosure.

As shown in FIG. 8B, the image processor 120 divides the input image Im into 9*8 calibration blocks BLKs, and divides the input image Im into four coverage regions COV1 to COV4. Each of the coverage regions COV1 to COV4 covers 5*4 calibration blocks BLKs, and the coverage regions COV1 to COV4 have the calibration blocks BLKs partially overlapping. The coverage region COV1 covers the characteristic patterns p1, p2 and p4, p5, the coverage region COV2 covers the characteristic patterns p2, p3 and p5, p6, the coverage region COV3 covers the characteristic patterns p4, p5 and p7, p8, and the coverage region COV4 covers the characteristic patterns p5, p6 and p8, p9.

It should be noted that, the covered characteristic patterns of the coverage regions COV1-COV4 are determined by the image processor 120. For example, the image processor 120 selects the characteristic pattern p1 as the covered characteristic pattern of the coverage region COV1, selects the characteristic pattern p3 as the covered characteristic pattern of the coverage region COV2, selects the characteristic pattern p7 as the covered characteristic pattern of the coverage region COV3, and selects the characteristic pattern p9 as the covered characteristic pattern of the coverage region COV4. In other embodiments, the image processor 120 may select a plurality of characteristic pattern as the covered characteristic patterns of the corresponding coverage region. For example, the characteristic patterns p1, p2 and p4 are selected as the covered characteristic patterns of the coverage region COV1, which is not limited thereto.

Figure 8C:
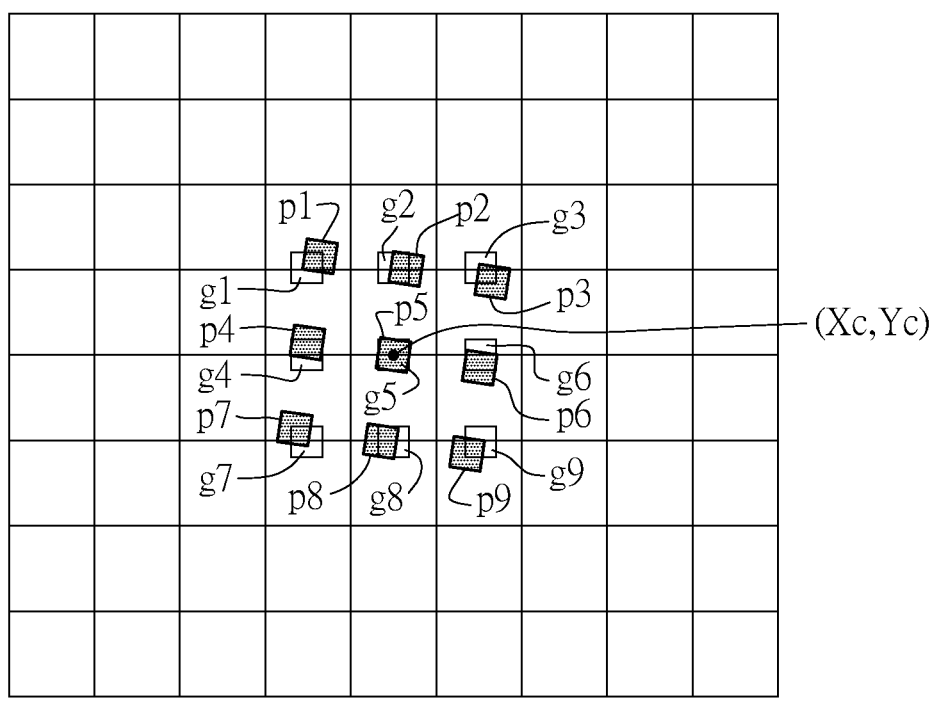
FIG. 8C shows a schematic diagram of a plurality of characteristic patterns and a plurality of target patterns according to one embodiment of the present disclosure.

For ease of illustration, the image processor 120 only selects one characteristic pattern as the covered characteristic pattern of one coverage region in the following descriptions. The covered characteristic patterns of the coverage regions COV1 to COV4 are the characteristic patterns p1, p3, p7 and p9. In step S820, the image processor 120 calculates an actual center coordinate (Xc, Yc) according to the positions of the characteristic patterns p1 to p9 within the analysis block 54, and then defines a plurality of target patterns according to the actual center coordinate (Xc, Yc). As shown in FIG. 8C, in this embodiment, the actual center coordinate (Xc, Yc) is just at the center of the characteristic pattern p5. The image processor 120 expands outwards centered on the actual center coordinate (Xc, Yc) to define a plurality of target patterns g1, g2, g3, g4, g5, g6, g7, g8 and g9. The positions of the target patterns g1 to g9 within the analysis block 54 correspond to positions of the characteristic patterns p1 to p9 within the analysis block 54 having no distortion.

Then, in step S830, the image processor 120 calculates a position difference between the covered characteristic pattern and its corresponding target pattern in each covered characteristic pattern to generate a plurality of difference vectors. Specifically, the image processor 120 obtains a plurality of characteristic points of the covered characteristic pattern (e.g., the characteristic pattern p1), and obtains a plurality of target points of the target patterns (e.g., the target pattern g1). The positions of the characteristic points within the covered characteristic pattern correspond to positions of the target points within the target pattern. After that, the image processor 120 calculates the position difference between each characteristic point and its corresponding target point, to generate the plurality of difference vectors accordingly.

Figure 8D:
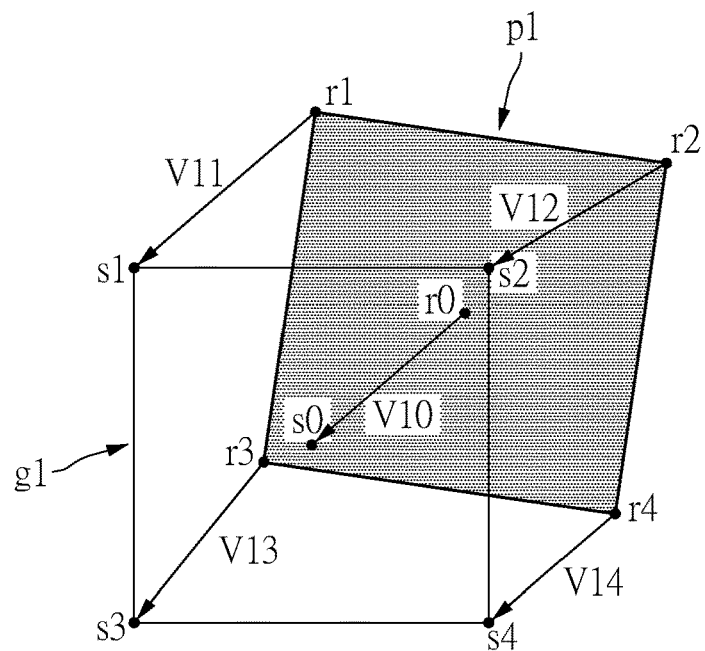
FIG. 8D shows a schematic diagram of one of the coverage regions in FIG. 8C.

In the above example, the covered characteristic patterns of the coverage regions COV1 to COV4 are characteristic patterns p1, p3, p7 and p9, respectively. FIG. 8D shows the covered characteristic pattern p1 of the coverage region COV1 and the target pattern g1. As shown in FIG. 8D, the image processor 120 captures the plurality of characteristic points r0, r1, r2, r3 and r4 of the characteristic pattern p1 (i.e., the center point, the upper left point, the upper right point, the lower left point and the lower right point of the characteristic pattern p1), and captures the target points s0, s1, s2, s3 and s4 of the target pattern g1 (i.e., the center point, the upper left point, the upper right point, the lower left point and the lower right point of the target pattern g1). Then, the image processor 120 calculates the position difference between each of the characteristic points r0, r1, r2, r3 and r4 and its corresponding target point (i.e., the target points s0, s1, s2, s3 or s4), to generate a plurality of difference vectors V10, V11, V12, V13 and V14 accordingly. Similarly, the image processor 120 can calculates the position differences between the characteristic patterns p3, p7 and p9 (considered the covered characteristic patterns in this embodiment) and their corresponding target patterns g3, g7 and g9 to generate the plurality of the difference vectors. The difference vectors corresponding to the characteristic patterns p1, p3, p7 and p9 are listed in the Table 1 as below.

TABLE 1

| Characteristic Pattern | Difference Vectors |
| --- | --- |
| p1 | V10, V11, V12, V13, V14 |
| p3 | V20, V21, V22, V23, V24 |
| p7 | V30, V31, V32, V33, V34 |
| p9 | V40, V41, V42, V43, V44 |

In step S840, the image processor 120 calculates a representative vectors according to the plurality of the difference vectors with respect to each of the coverage regions COV1 to COV4. In one embodiment, the image processor 120 selects a proper difference vector as the representative vector according to the positions wherein the coverage regions COV1 to COV4 are in the input image Im. For example, the coverage region COV1 is at the upper left corner of the input image Im, so the image processor 120 selects the difference vector V11 shown in FIG. 8D as the representative vector of the coverage region COV1. For another example, the coverage region COV4 is at the lower right corner of the input image Im, so the image processor 120 selects the vector V44 shown in FIG. 8D as the representative vector of the coverage region COV4. For each of the coverage regions COV1 to COV4, the image processor 120 can also randomly select one of the corresponding difference vectors as the representative vector. For example, the image processor 120 can randomly selects the difference vector V13 from the difference vectors V10 to V14 as the representative vector of the coverage region COV1.

In this embodiment, the image processor 120 selects the difference vector V11 as the representative vector of the coverage region COV1, selects the difference vector V22 as the representative vector of the coverage region COV2, selects the difference vector V33 as the representative vector of the coverage region COV3, and selects the difference vector V44 as the representative vector of the coverage region COV4.

In other embodiments, the image processor 120 can also average all of the corresponding difference vectors in each coverage region and takes the average vector as the representative vector of the coverage region. For example, the image processor 120 can average all of the corresponding difference vectors V10, V11, V12, V13 and V14 in the coverage region COV1, and take the average vector as the representative vector of the coverage region COV1. The method that the image processor 120 obtains the representative vector one of each coverage region is not restricted herein.

In step S850, the image processor 120 adjusts the representative vector with respect to each of the coverage regions COV1 to COV4, and applies the adjusted representative vector to each of calibration blocks BLKs within each of the coverage regions COV1 to COV4. Each of the calibration blocks has at least one adjusted representative vector. Further, in each coverage region, the image processor 120 generates an adjusted representative vector of each calibration block according to the position of the covered characteristic pattern within the calibration block and the position of each calibration block.

In this embodiment, when the calibration block is farther from the covered characteristic pattern, it indicates that the calibration block needs to be much more calibrated. In this case, the adjusted representative vector generated by the image processor 120 will be larger. On the other hand, when the calibration block is closer to the covered characteristic pattern, it indicates that the calibration block may be calibrated fewer. In this case, the adjusted representative vector generated by the image processor 120 will be smaller. In other embodiments, the image processor 120 can adjust the representative vector according to other features that the covered characteristic pattern in the calibration block has, which is not limited thereto.

Figure 8E:
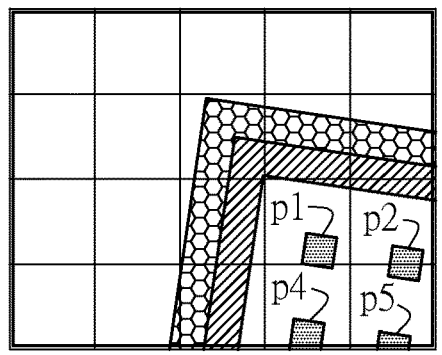
FIG. 8E shows a schematic diagram of one of the covered characteristic patterns and its corresponding target pattern according to one embodiment of the present disclosure.

As described, the image processor 120 adjusts the difference vector V11, namely, the representative vector in the coverage region COV1. As shown in FIG. 8E, the coverage region COV1 includes 20 calibration blocks BLKs, and the calibration blocks BLKs from the top left to the bottom right are the first calibration block BLK to the $20^{th}$ calibration block BLK. The characteristic pattern p1 serving as the covered characteristic pattern is in the $14^{th}$ calibration block BLK. The image processor 120 adjusts the difference vector V11, namely, the representative vector according to the position where the characteristic pattern p1 is located among 20 calibration blocks BLKs. The closer the calibration blocks BLKs are to the characteristic pattern p1, the closer the adjusted representative vectors will be to the difference vector V11. The farther the calibration blocks BLKs from the characteristic pattern p1, the larger the adjusted representative vectors will be than the difference vector V11.

Figure 8F:
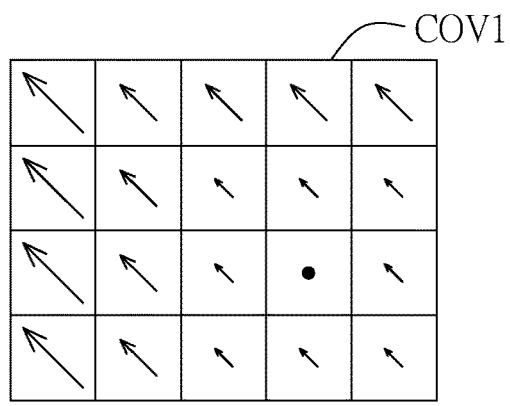
FIG. 8F shows a schematic diagram of an adjusted representative vector of one of the coverage regions according to one embodiment of the present disclosure.

Therefore, as shown in FIG. 8F, in the coverage region COV1, the $14^{th}$ calibration block BLK has an adjusted representative vector which is the most closer to the adjusted representative vector. The $8^{th}$ to $10^{th}$, $13^{th}$, $15^{th}$ and $18^{th}$ to $20^{th}$ calibration blocks BLKs have the third largest adjusted representative vector, the second to fifth, $7^{th}$, $12^{th}$ and $17^{th}$ calibration blocks BLKs have the second largest adjusted representative vector, and the first, sixth, $11^{th}$ and $16^{th}$ calibration blocks BLKs have the largest adjusted representative vector. According to FIG. 8F, in the coverage region COV1, the adjusted representative vector gradually increases outwards from the $14^{th}$ calibration block BLK.

Figure 8G:
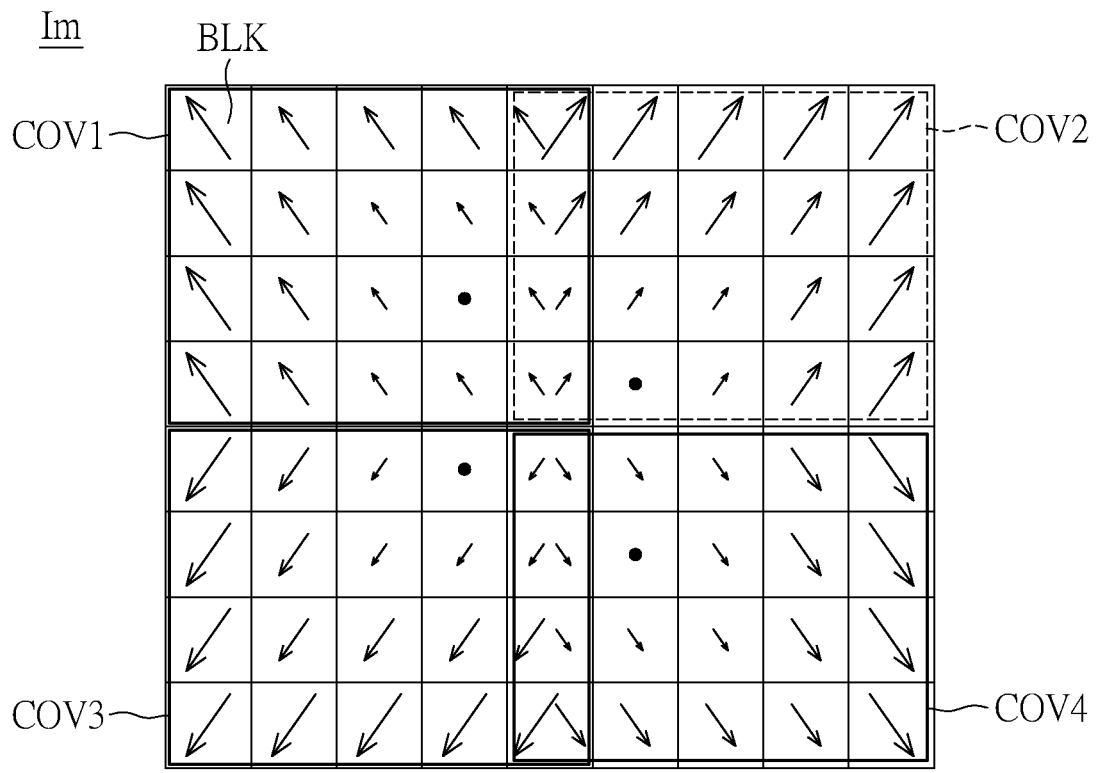
FIG. 8G shows a schematic diagram of an adjusted representative vector of each calibration block according to one embodiment of the present disclosure.

Similarly, in the coverage regions COV2 to COV4, the image processor 120 calculates the adjusted representative vector of each calibration block in this manner. After the image processor 120 calculates the adjusted representative vector of each calibration block BLK in the coverage regions COV1 to COV4, these adjusted representative vectors of each calibration block in the coverage regions COV1 to COV4 are shown in FIG. 8G In FIG. 8G, four calibration blocks BLKs in the coverage region COV1 overlap four calibration blocks BLKs in the coverage region COV2, so the four overlapping calibration blocks BLKs have two adjusted representative vectors.

Figure 8H:
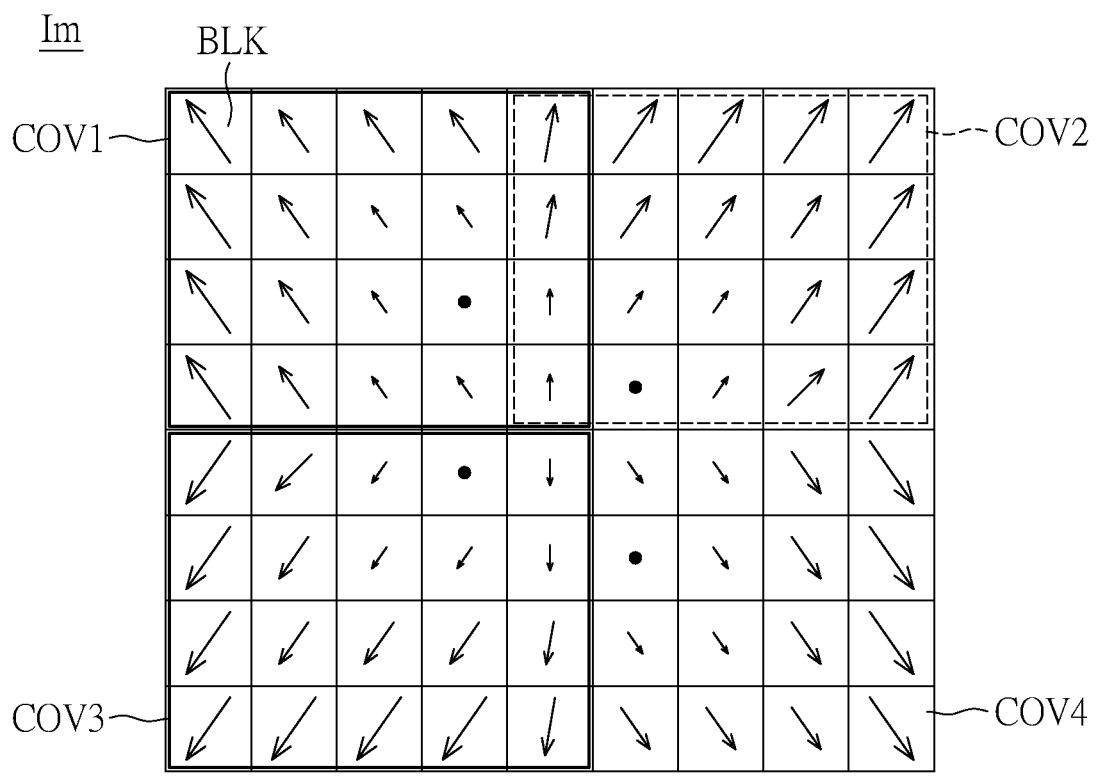
FIG. 8H shows a schematic diagram of a calibration vector of each calibration block according to one embodiment of the present disclosure

In step S860, the image processor 120 averages the representative vectors to generate a calibration vector in each of the calibration blocks COV1 to COV4. Referring to FIG. 8G and FIG. 8H, in FIG. 8G there is only one adjusted representative vector in the first calibration block BLK, and thus the calibration vector (in the first calibration block BLK in FIG. 8H) generated by the image processor 120 is identical to the adjusted representative vector after averaging the adjusted representative vector. There is two adjusted representative vectors in the fifth calibration block BLK, and thus the calibration vector (in the fifth calibration block BLK in FIG. 8H) is generated by the image processor 120 after averaging the adjusted representative vectors.

Finally, in step S870, the image processor 120 calibrates the input image Im according to the calibration vectors in each of the calibration blocks BLKs. Those skilled in the art should understand how the image processor 120 calibrates the input image Im according to step S870, and thus relevant details are omitted.

To sum up, in the image calibration method and the image calibration apparatus provided by the present disclosure, a calibration pattern (e.g., the calibration pattern 50) in an input image is analyzed to capture an analysis block (e.g., the analysis block 54 having the characteristic patterns p1 to p9) having characteristic patterns. Then, according to positions where the characteristic patterns are in the analysis block, the input image will be calibrated via the displacement calibration, the scaling ratio, the rotation angle, the rotation calibration, the keystone calibration or the combination thereof, to generate an output image. In this manner, image distortions of the image calibration apparatus can be reduced so that the calibration of the output image generated by the image calibration apparatus will be improved.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An image calibration method, adapted to an image calibration apparatus, comprising:
   step (A): capturing an input image having a calibration pattern, wherein the calibration pattern includes at least one frame and an analysis block, the analysis block is surrounded by the at least one frame, and the analysis block includes a plurality of characteristic patterns separated from each other;

step (B): determining whether the at least one frame is within the input image;

step (C): capturing the analysis block when the at least one frame is within the input image; and step (D): executing one of a displacement calibration, a scaling ratio, a rotation calibration, a keystone calibration or a combination thereof for the input image according to positions of the characteristic patterns within the analysis block to generate an output image.

2. The image calibration method according to claim 1, wherein the at least one frame includes a first frame and a second frame, the first frame and the second frame are monochromatic, the color of the first frame has a first color, the color of the second frame has a second color, and the first frame contacts the second frame and the first color and the second color are different colors.

3. The image calibration method according to claim 2, wherein the step (B) further includes:
scanning the calibration pattern in a predetermined direction;
determining whether a pixel number of the first color is over a first predetermined value;
determining whether a pixel number of the second color is over a second predetermined value when the pixel number of the first color is over the first predetermined value; and
determining whether the at least one frame is within the input image when the pixel number of the second color is over the second predetermined value.

4. The image calibration method according to claim 1, wherein the analysis block further includes a plurality of anchor patterns, the anchor patterns are at corners of the analysis block, and the step (C) further includes:
detecting a pixel position of each anchor pattern within the input image; and
capturing the analysis block according to the pixel position of each anchor pattern.

5. The image calibration method according to claim 1, wherein the displacement calibration in the step (D) further includes:
calculating an actual center coordinate of the analysis block according to the positions of the characteristic patterns within the analysis block;
calculating a displacement value between an ideal center coordinate of an ideal block and the actual center coordinate, wherein the ideal block refers to the analysis blocks having no distortion; and
calibrating the input image according to the displacement value.

6. The image calibration method according to claim 1, wherein an ideal block is simulated by the image calibration apparatus, the ideal block includes a plurality of ideal patterns, positions of the ideal patterns within the ideal block correspond to the positions of the characteristic patterns within the analysis block having no distortion, and the displacement calibration in the step (D) further includes:
calculating an actual analysis coordinate of one of the characteristic patterns in the analysis block;
calculating a displacement value between the actual analysis coordinate and an ideal analysis coordinate of one of the ideal patterns in the ideal block, wherein the one of the characteristic patterns is corresponding to the one of the ideal patterns; and
calibrating the input image according to the displacement value.

7. The image calibration method according to claim 1, wherein an ideal block is simulated by the image calibration apparatus, the ideal block includes a plurality of ideal patterns, the ideal patterns includes a first ideal pattern and a second ideal pattern, the characteristic patterns includes a first characteristic pattern and a second characteristic pattern, positions of the first ideal pattern and the second ideal pattern within the ideal block correspond to positions of the first characteristic pattern and the second characteristic pattern within the analysis block, and the scaling ratio in the step (D) further includes:
calculating an actual distance between the first characteristic pattern and the second characteristic pattern and an ideal distance between the first ideal pattern and the second ideal pattern;
calculating a scaling ratio between the actual distance and the ideal distance; and
calibrating the input image by the scaling ratio.

8. The image calibration method according to claim 1, wherein an ideal block is simulated by the image calibration apparatus, the analysis block includes a plurality of anchor patterns, the anchor patterns are at corners of the analysis block and includes a first anchor pattern and a second anchor pattern, the ideal block includes a plurality of ideal anchor patterns, the ideal anchor patterns include a first ideal anchor pattern and a second ideal anchor pattern, positions of the first ideal anchor pattern and the second ideal anchor pattern within the ideal block correspond to positions of the first anchor pattern and the second anchor pattern within the analysis block having not distortion, and the scaling ratio in the step (D) further includes:
calculating an actual distance between the first anchor pattern and the second anchor pattern and an ideal distance between the first ideal anchor pattern and the second ideal pattern;
calculating a scaling ratio between the actual distance and the ideal distance; and
calibrating the input image by the scaling ratio.

9. The image calibration method according to claim 1, wherein the rotation calibration in the step (D) further includes:
calculating an actual center coordinate according to the positions of the characteristic patterns within the analysis block;
calculating a deviation angle between the actual center coordinate and at least one of the characteristic patterns, respectively;
calculating slopes corresponding to a first characteristic pattern and a second characteristic pattern among the characteristic patterns according to coordinates of the first characteristic pattern and the second characteristic pattern, each deviation angle and a rotation equation;
selecting the deviation angle corresponding to the characteristic pattern with the minimum slope as a rotation angle; and
calibrating the input image according to the rotation angle.

10. The image calibration method according to claim 1, wherein the keystone calibration in the step (D) further includes:
dividing the input image into a plurality of calibration blocks and coverage regions, wherein the coverage regions cover all the calibration blocks, and each coverage region covers part of the calibration blocks and a covered characteristic pattern;

calculating an actual center coordinate according to the positions of the characteristic patterns within the analysis block, and defining a plurality of target patterns according to the actual center coordinate, wherein positions of the target patterns within the analysis block correspond to the positions of the characteristic pattern within the analysis block having no distortion;

in each covered characteristic pattern, calculating a position difference between the covered characteristic pattern and its corresponding target pattern to generate a plurality of difference vectors;

with respect to each coverage region, calculating a representative vector according to the difference vectors;

adjusting the representative vector and applying the adjusted representative vector to each calibration block in the coverage region, wherein each calibration block in the coverage region has the adjusted representative vector;

in each calibration block, averaging the representative vectors to generate a calibration vector; and calibrating the input image according to the calibration vector of each calibration block.

11. The image calibration method according to claim 10, wherein the step of calculating the position difference between the covered characteristic pattern and its corresponding target pattern further includes:

obtaining a plurality of characteristic points of the covered characteristic pattern and a plurality of target points on the corresponding target pattern that are at the same positions as the characteristic points; and calculating the position difference between each characteristic point and its corresponding target point to generate the plurality of the difference vectors.

12. An image calibration apparatus, comprising:

an image capturing device, capturing an input image having a calibration pattern, wherein the calibration pattern includes at least one frame and an analysis block, the analysis block is surrounded by the frame, and the analysis block includes a plurality of characteristic patterns separated from each other;

an image processor, coupled to the image capturing device, and configured to execute the following steps:

step (A): receiving the input image;

step (B): determining whether the at least one frame is within the input image;

step (C): capturing the analysis block when the at least one frame is within the input image; and step (D): executing one of a displacement calibration, a scaling ratio, a rotation calibration, a keystone calibration or a combination thereof for the input image according to positions of the characteristic patterns within the analysis block to generate an output image.

13. The image calibration apparatus according to claim 12, wherein the at least one frame includes a first frame and a second frame, the first frame and the second frame are monochromatic, the color of the first frame has a first color, the color of the second frame has a second color, and the first frame touches the second frame and the first color and the second color are different colors.

14. The image calibration apparatus according to claim 12, wherein the analysis block includes nine characteristic patterns, and the characteristic patterns are arranged as a square.

* * * * *